United States Patent
Su et al.

(10) Patent No.: US 8,330,075 B2
(45) Date of Patent: Dec. 11, 2012

(54) CONTROL METHOD OF OPTICAL CUTTING

(75) Inventors: Chiung-Chieh Su, Longtan Township, Taoyuan County (TW); Shih-Chu Huang, Longtan Township, Taoyuan County (TW); Shih-Shan Wei, Longtan Township, Taoyuan County (TW); Meng-Chiuan Yu, Longtan Township, Taoyuan County (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 696 days.

(21) Appl. No.: 12/545,827

(22) Filed: Aug. 22, 2009

(65) Prior Publication Data
US 2011/0042363 A1    Feb. 24, 2011

(51) Int. Cl.
*B23K 26/42* (2006.01)
*B23D 26/067* (2006.01)
*B28D 5/00* (2006.01)

(52) U.S. Cl. .......... 219/121.72; 219/121.67; 219/121.83
(58) Field of Classification Search ............ 219/121.72, 219/121.67, 121.83
See application file for complete search history.

(56) References Cited

U.S. PATENT DOCUMENTS

| | | | |
|---|---|---|---|
| 6,407,360 B1 * | 6/2002 | Choo et al. | 219/121.67 |
| 6,590,181 B2 * | 7/2003 | Choo et al. | 219/121.68 |
| 6,723,952 B2 * | 4/2004 | Choo et al. | 219/121.72 |
| 2002/0088780 A1 * | 7/2002 | Boyle et al. | 219/121.69 |
| 2008/0074747 A1 * | 3/2008 | Cheng et al. | 359/566 |
| 2008/0087359 A1 * | 4/2008 | Zurecki et al. | 148/511 |
| 2009/0126403 A1 * | 5/2009 | Abramov et al. | 65/29.18 |
| 2010/0305910 A1 * | 12/2010 | Yilbas et al. | 703/2 |

* cited by examiner

*Primary Examiner* — Zandra Smith
*Assistant Examiner* — Tsz Chiu

(57) ABSTRACT

The invention discloses a control method of optical cutting. A laser processing module is used to generate a cutting heat source and an auxiliary heat source. The control method of optical cutting includes the steps of determining a cutting path on the work piece first; then calculating a thermal stress distribution along the cutting path according to a heating condition; next determining an irradiation condition for the auxiliary cutting heat source according to the thermal stress distribution induced by the cutting heat source; and irradiating the work piece along the cutting path with the cutting heat source and simultaneously irradiating the work piece with the auxiliary cutting heat source. The cutting of the work piece is therefore finished.

11 Claims, 3 Drawing Sheets

CONTROL METHOD OF OPTICAL CUTTING

BACKGROUND OF THE INVENTION

1. Field of the Invention

This invention relates to a control method of optical cutting. It is performed as follows: first analyze the thermal stress distribution along a cutting path with a numerical analysis method, and then balance the undesired thermal stress with auxiliary heat sources.

2. Description of the Prior Art

Glass, ceramic materials, and such brittle materials are often used in many products or electronic apparatuses. For a flat panel display, a glass substrate is an important component thereof and is usually cut by means of mechanical machining or laser.

Cutting glass by means of mechanical machining is mostly performed with diamond wheel cutter and high-hardness metal wheel cutter. The processing includes three steps: carving, cleaving and grinding. Firstly, on the surface of glass, carve the line of desired shape to generate crack, then apply mechanical load on the crack to cleave the glass, and finally grind the edge of the cleaved glass to remove the swarf. Therefore, the method of mechanical glass cutting is much more complicated due to the more requirement of equipment, processing time, and labor cost. Additionally, the cutting edge is not smooth and has tiny cracks. The problems of residual stress and tiny pieces of swarf make the mechanical machining not conducive to large-size glass cutting. However, the above defects will not appear if a proper laser is applied for the glass cutting.

As the technique of laser develops, the laser sources are currently classified into two classes. One is that the laser could be absorbed by the work piece; the other is that the laser could penetrate the work piece. In addition, the glass cutting thereof is also classified into two classes: thermal melting method and thermal cracking method. Adopting the thermal melting method, the processing zone temperature is quite high and the cutting surface is not good. However, if the thermal cracking method is adopted, the processing zone temperature is low relatively, but it is still not easy to control the cutting surface.

The thermal cracking means that the thermal stress is used to generate cracking. It is valued because there is less swarf and less following work. The heat source generating thermal stress is usually a laser. There are various laser sources for glass cutting on the market, such as $CO_2$ gas laser, Nd—YAG solid-state laser, Yb—YAG solid-state laser and so on. Because of the different wavelengths thereof, the extents of energy of different lasers absorbed by material are also different. The induced stress fields are therefore quite various. Furthermore, the sensitive relation between the stress field and the processing condition is the main reason why the cutting control is not easy. The common defects of thermal crack cutting are: the deviation of cutting path near the edge of work piece, the asymmetrical cutting of thick work piece with slant, staged, bumpy cutting surface, the non-accomplishable processing for closed path cutting, and so on. In practical application, if the work piece is not of flat cutting surface or not coincident with the desired shape, it will result in product disposal and thus increase the processing time and the product cost.

Therefore, the invention provides a control method of optical cutting. A thermal crack cutting path (cutting path for short) of a work piece is determined first. The thermal stress distribution of non-cracked work piece is obtained by analysis. The work piece is then irradiated along the cutting path with auxiliary heat sources so as to eliminate the undesired thermal stress of non-cracked work piece. It thus makes the actual cutting be coincident with the predetermined cutting path, increases the yield of product and further improves the quality of cutting surface.

SUMMARY OF THE INVENTION

The invention discloses a control method of optical cutting with a laser processing module to cut a work piece. The laser processing module is used to generate a cutting heat source and an auxiliary heat source. The control method of optical cutting includes the following steps. First, a step (a) is performed: determining a thermal cracking cutting path. Next, a step (b) is performed: calculating a thermal stress distribution of non-cracked work piece along the cutting path according to a heating condition. Next, a step (c) is performed: determining an irradiation condition for the auxiliary heat sources to balance the undesired thermal stress of non-cracked work piece. At last, a step (d) is performed: irradiating the work piece along the cutting path with the cutting heat source and simultaneously irradiating the work piece with the auxiliary heat source. The cutting is therefore finished.

Compared with the prior art, the control method of optical cutting of the invention is to determine a thermal cracking cutting path of a work piece first. The thermal stress distribution of non-cracked work piece is obtained by analysis. The work piece is then to be irradiated additionally with the auxiliary heat source so as to eliminate the undesired thermal stress of non-cracked work piece. It further improves the quality of cutting surface, makes the actual cutting path be coincident with the predetermined cutting path and increases the yield of product.

The advantages and spirit of the invention may be understood by the following recitations together with the appended drawings.

BRIEF DESCRIPTION OF THE APPENDED DRAWINGS

DETAILED DESCRIPTION OF THE INVENTION

Figure 1A:
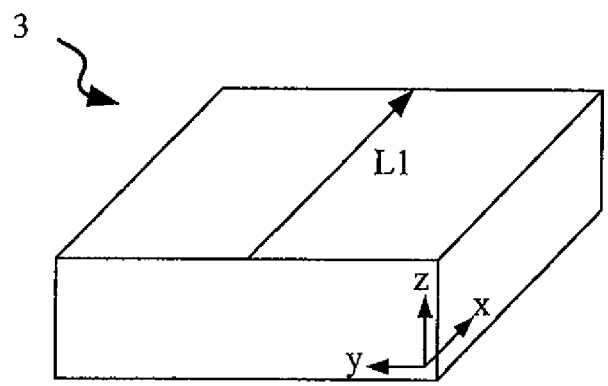
FIG. 1A is a schematic diagram illustrating a work piece.

FIG. 1A is a schematic diagram illustrating a work piece 3. The invention provides a control method for a laser processing module (not shown in FIG. 1A) cutting the work piece 3. The work piece 3 could be flat glass, but it is not limited in this invention. The laser processing module is used to generate a cutting heat source and an auxiliary heat source (not shown in FIG. 1A).

In the following, a detailed description is made for the theory on which the control method of optical cutting of the invention is based.

First Bueckner's theory shows that the stress distribution of an object with cracks under external loading is the sum of the stress of "the object without cracks under the same external loading" and the stress of "the object with cracks under external equivalent loading at the cracks". The equivalent loading is the stress of "the object without cracks under the same external loading" at the cracks. In addition, based on Strain Energy Density theory, the distribution of the magnitude of stress on the crack decides the crack propagation speed, and the distribution of the different kinds of stress on the crack decides the crack propagation direction. In other words, if the crack surface is only subjected to the normal stress, the crack will propagate along the extension of crack surface; and if the crack surface is only subjected to the shear stress, the crack propagation will be substantially perpendicular to the crack surface.

Therefore, the control method of optical cutting of the invention is based on the above theory and the thermal stress distribution of material under heating obtained by the numerical analysis software (e.g. CFDRC). When the cutting heat source of the laser processing module can penetrate the work piece 3 and the portions of work piece 3 at both sides of the cutting path are symmetrical, it is found that the shear stress on the cutting surface is very small (compared with the tensile stress). When the irradiation of the cutting heat source is near the edge of work piece 3 (i.e. the portions of work piece 3 at both sides of the cutting path are asymmetrical), the shear stress on the cutting surface increases noticeably.

Then the following description is for the embodiment of the control method of optical cutting of the invention.

Figure 1B:
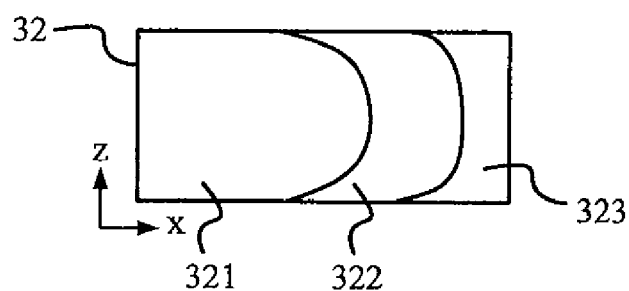
FIG. 1B is a shear stress distribution on the cutting surface in FIG. 1A.
Figure 1C:
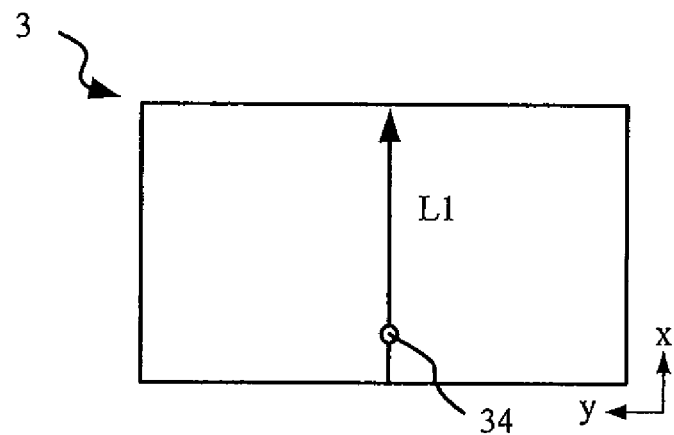
FIG. 1C is a top view of the work piece in FIG. 1A.
Figure 3:
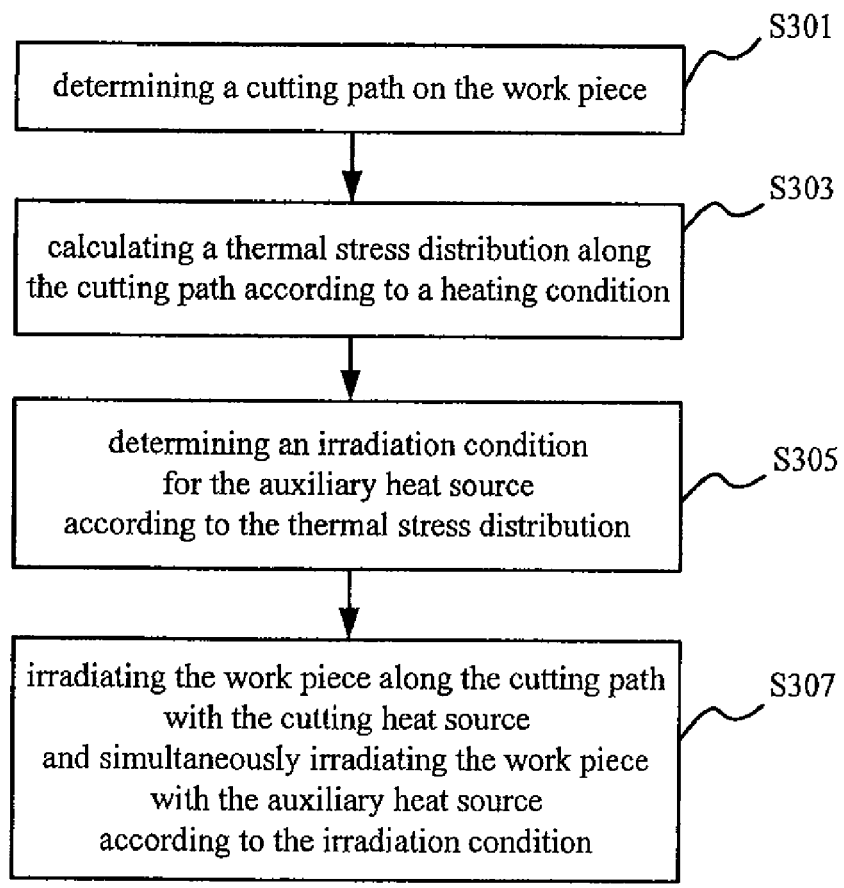
FIG. 3 is a work flow chart of the invention.

Refer to FIGS. 1A, 1C and 3. FIG. 3 is a flow chart of the control method of optical cutting of the invention. FIG. 1C is a top view of the work piece 3. As shown in FIGS. 1A, 1C and 3, in the embodiment, a cutting path L1 is determined first, and it is a first irradiation location of a cutting heat source 34. It is noticed that the shape of the cutting path L1 is not specified particularly and the cutting path L1 could be any line. In this embodiment, the cutting path L1 is at the center line of work piece 3. Then, the thermal stress distribution around the cutting path L1 is calculated with the numerical analysis software (but not limited to this) according to the path shape of cutting path L1 and the geometrical shape of work piece 3. Therein, the thermal stress includes the normal stress $(\sigma_y)$ and the shear stresses $(\tau_{xy}, \tau_{yz})$.

FIG. 1B is a simulation result of shear stress on the cutting surface 32 of work piece 3 in FIG. 1A at the cutting path L1. As shown in FIGS. 1A and 1B, the cutting path L1 of work piece 3 is a straight line and the shear stress distribution in FIG. 1B is obtained by the calculation of numerical analysis software. As shown in FIG. 1B again, the cutting surface 32 along the cutting path L1 has areas 321, 322 and 323. The magnitudes of the shear stresses $(\tau_{xy}, \tau_{yz})$ at the areas 321, 322 and 323 are close to zero (not shown in FIG. 1B).

In the embodiment, because there is less effect of shear stress on the cutting surface of work piece 3 along the cutting path L1, the work piece 3 can be precisely cut into the shape in accordance with the predetermined cutting path L1 without the need of auxiliary heat source and the cutting surface is flat and perpendicular to the surface of work piece 3. Furthermore, the cutting heat source 34 could be generated by adjusting a first irradiation intensity and a first irradiation movement speed so as to control the required cutting time.

As discussed above, it is concluded that the shear stress affects the crack extension direction. In other words, the shear stress affects the shape and the flatness of the cutting surface. When the portions of work piece 3 at the both sides of cutting path L1 are symmetrical, on the cutting surface, the shear stress is much smaller than the normal stress $\sigma_y$. Therefore the work piece 3 can be precisely cut along the cutting path L1, and the cutting surface is flat and perpendicular to the surface of work piece 3.

Figure 2A:
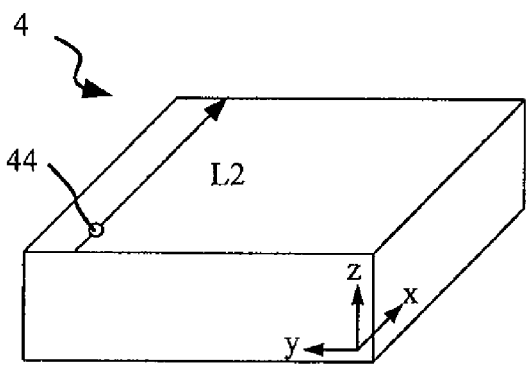
FIG. 2A is a schematic diagram of another embodiment of the invention.
Figure 2C:
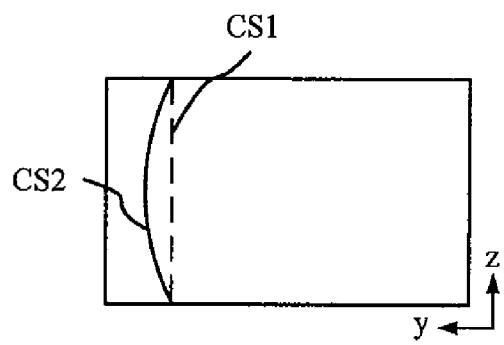
FIG. 2C is a cross section perpendicular to the cutting path in FIG. 2A.
Figure 2B:
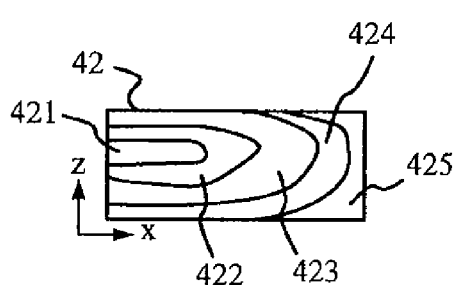
FIG. 2B is a shear stress distribution on the cutting surface in FIG. 2A.

Refer to FIGS. 2A, 2B and 3. FIG. 2A is a schematic diagram for another embodiment of the invention. FIG. 2B is a distribution of shear stress $\tau_{yz}$ on the cutting surface 42 of a work piece 4 along a cutting path L2. As shown in FIGS. 2A, 2B and 3, in this embodiment, a step S301 is first performed: determining the cutting path L2 on the work piece 4. It is noticed that the determination of the cutting path L2 depends on a user's request and it is not limited to this embodiment.

In this embodiment, the cutting path L2 is determined near the edge of work piece 4. Then, a step S303 is performed: calculating a thermal stress distribution along the cutting path L2 according to a heating condition. Therein, the heating condition could be a heating temperature, but not limited to this. For example, the thermal stress distribution is calculated by the numerical analysis software (but not limited to this) according to the path shape (not limited to the straight line of this embodiment, the cutting path L2 could be any line) and the geometrical shape, the thickness and the material of work piece 4. Therein, the thermal stress includes the normal stress $(\sigma_y)$ and the shear stresses $(\tau_{xy}, \tau_{yz})$.

TABLE I

| area | shear stress $\tau_{yz}$ (N/m²) |
|---|---|
| 421 | $-2.5 * 10^6$ |
| 422 | $-1 * 10^6$ |
| 423 | $-5 * 10^5$ |
| 424 | $5 * 10^5$ |
| 425 | $1 * 10^6$ |

Table I shows the magnitudes of the shear stress $\tau_{yz}$ generated by a cutting heat source 44 moving to the middle of cutting path L2. The distribution of shear stress $\tau_{yz}$ is shown in FIG. 2B. The normal stress $\sigma_y$ is about $10^7$ N/m². As shown in Table I, the shear stress, $\tau_{yz}$, distribution on the cutting surface 42 is quite non-uniform, and the magnitude of shear stress $\tau_{yz}$, is substantially equivalent to that of normal stress $\sigma_y$. It is noticed that Table I is merely an example, the values therein are not limited in particular and may vary according to different conditions (e.g. the cutting path L2, the material of the work piece 4, and so on).

Figure 2D:
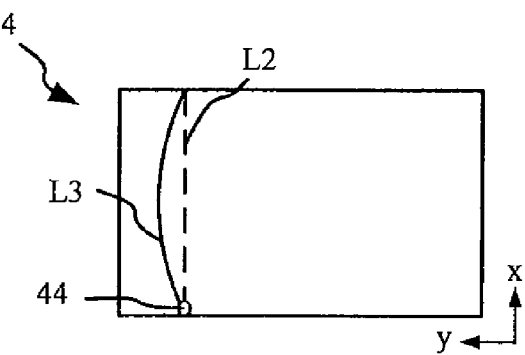
FIG. 2D is a top view of the work piece in FIG. 2A.

FIG. 2C is a cross section of the work piece 4 perpendicular to the cutting path L2. If the work piece 4 is cut by a single cutting heat source 44 in the embodiment, the shear stress $\tau_{yz}$ makes the shape of actual cutting surface be the surface CS2, not the surface CS1 perpendicular to the surface of the work piece 4. FIG. 2D is a top view of the work piece 4. Similarly, if the work piece 4 is cut by a single cutting heat source 44 in the embodiment, the analyzed magnitude of the shear stress $\tau_{xy}$ is substantially equivalent to that of the normal stress $\sigma_y$. It will make the cutting path L3 deviate from the predetermined cutting path L2.

Figure 2E:
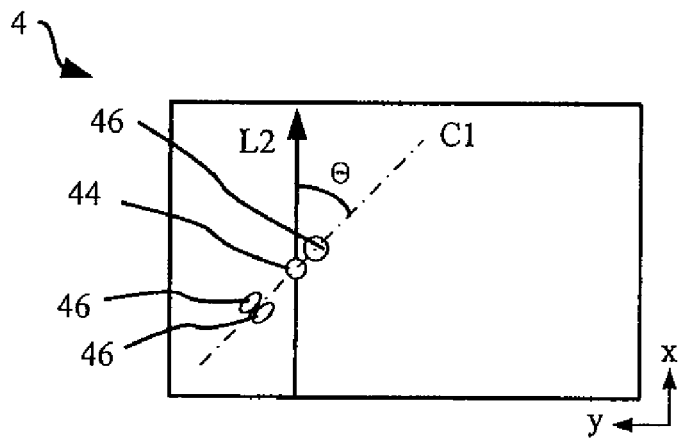
FIG. 2E is a schematic diagram illustrating how the auxiliary heat source is applied on the work piece.

FIG. 2E is a schematic diagram illustrating that an auxiliary cutting heat source 46 is added. The distribution of shear stress (as shown in the Table I) generated by the cutting heat source 44 on the cutting surface is obtained by the numerical analysis software, a step S305 is then performed: determining the irradiation location and the irradiation intensity of the auxiliary cutting heat source 46 according to the thermal stress distribution. In other words, according to the distribution of the shear stress generated by the cutting heat source 44, the auxiliary heat source 46 is generated so as to induce the balancing shear stress. At last, a step S307 is performed:

irradiating the work piece 4 along the cutting path L2 with the cutting heat source 44 and simultaneously irradiating the work piece 4 with the auxiliary heat source 46. In other words, during the irradiation on the work piece 4 along the cutting path L2 with the cutting heat source 44, the auxiliary cutting heat source 46 simultaneously irradiate the work piece 4 so as to eliminate the shear stress distributed on the cutting surface along the cutting path L2. The cut surface is therefore flat and perpendicular to the surface of work piece 4, and the actual cutting path is coincident with the predetermined cutting path L2.

Therein, the irradiation conditions for the auxiliary cutting heat source 46 includes a second irradiation location, a second irradiation intensity and a second movement speed, which are adjusted according to the distribution of the shear stress on the cutting surface. Furthermore, the cutting heat source 44 and the auxiliary heat source 46 may be generated by different laser sources or by splitting one laser source. It is not limited in the invention.

As shown in FIG. 2E, the cutting heat source 44 and the auxiliary cutting heat source 46 are arranged along a heat source arrangement axis C1. When the cutting heat source 44 and the auxiliary heat sources 46 are applied together and the heat source arrangement axis C1 is coincident with the cutting path L2, for a symmetric cutting the actual cutting surface and the actual cutting path are both good. In another embodiment, i.e. an asymmetric cutting, the angle between the heat source arrangement axis C1 and the cutting path L2 is thus adjusted from 30 degrees to 120 degrees. The processing quality of the cut surface is then noticeably improved and the cutting path L2 is good as well, without much deviation.

Compared with the prior art, the control method of optical cutting of the invention is first analyzing the thermal stress distribution on the cutting surface. Next, the condition for the auxiliary cutting heat source is determined by analysis to alleviate the undesired shear stress. The conditions include a second irradiation location, a second irradiation intensity and a second movement speed. Then the irradiation is performed with two different heat sources. It further improves the quality of the cut surface and makes the actual cutting path be coincident with the predetermined cutting path. The yield of product is therefore increased.

With the above examples and explanation, hopefully, the features and spirit of the invention will be well described. Those skilled in the art will readily observe that numerous modifications and alterations of the device may be made while retaining the features and spirit of the invention. Accordingly, the above disclosure should be construed as limited only by the metes and bounds of the appended claims.

What is claimed is:

1. A control method of optical cutting using a laser processing module to cut a work piece, wherein the laser processing module generating a cutting heat source and an auxiliary cutting heat source for an actual cut to coincide with a predetermined cutting path, and said control method of optical cutting comprising the following steps of:
   (a) determining the cutting path on the work piece;
   (b) calculating a distribution of a thermal stress along the cutting path, according to a heating condition, a shape of the path, as wells as a geometrical shape, thickness and material of the work piece, wherein the thermal stress includes a normal stress and shear stresses;
   (c) determining an irradiation condition for the auxiliary cutting heat source according to the distribution of the shear stresses induced by the cutting heat source for counter-balancing and eliminating the shear stresses; and
   (d) irradiating the work piece along the cutting path with the cutting heat source and simultaneously irradiating the work piece with the auxiliary heat source according to the irradiation condition.

2. The control method of optical cutting of claim 1, wherein the step (b) further comprises the following step of: (b1) calculating the thermal stress distribution on a cutting surface of the work piece along the cutting path by an algorithm.

3. The control method of optical cutting of claim 2, wherein the algorithm is a numerical analysis method.

4. The control method of optical cutting of claim 1, wherein the cutting heat source is used to cut the work piece along the cutting path.

5. The control method of optical cutting of claim 1, wherein the heating condition comprises a heating temperature.

6. The control method of optical cutting of claim 1, wherein the auxiliary cutting heat source comprises at least one heat spot.

7. The control method of optical cutting of claim 1, wherein the cutting heat source and the auxiliary cutting heat source are generated by difference laser sources respectively.

8. The control method of optical cutting of claim 1, wherein the cutting heat source and the auxiliary cutting heat source are generated by splitting a laser source.

9. The control method of optical cutting of claim 1, wherein the laser processing module is capable of adjusting a first irradiation location, a first irradiation intensity, and a first irradiation movement speed of the cutting heat source.

10. The control method of optical cutting of claim 1, wherein the work piece has an appearance without cracks.

11. The control method of optical cutting of claim 1, wherein the irradiation condition comprises a second irradiation location, a second irradiation intensity, and a second irradiation movement speed of the auxiliary cutting heat source.

* * * * *